United States Patent [19]

Ohnsorge

[11] Patent Number: 4,686,667
[45] Date of Patent: Aug. 11, 1987

[54] BROADBAND INTEGRATED SUBSCRIBER LOOP SYSTEM

[75] Inventor: Horst Ohnsorge, Freiberg A.N., Fed. Rep. of Germany

[73] Assignee: Standard Electrik Lorenz AG, Stuttgart, Fed. Rep. of Germany

[21] Appl. No.: 697,314

[22] Filed: Feb. 1, 1985

[30] Foreign Application Priority Data

Feb. 3, 1984 [DE] Fed. Rep. of Germany ....... 3403659

[51] Int. Cl.$^4$ ............................................. H04B 9/00
[52] U.S. Cl. ..................................................... 370/4
[58] Field of Search ..................... 370/1, 3, 4, 79, 112

[56] References Cited

U.S. PATENT DOCUMENTS 4,441,180 4/1984 Schussler ................................. 370/4

FOREIGN PATENT DOCUMENTS 24618 6/1983 European Pat. Off. .

OTHER PUBLICATIONS

Senmoto et al–NTG Fachber (Germany), vol. 73, 1980, pp. 51–55.
Miki et al–NTG Fachbor, vol. 73, 1980, pp. 41–45.
Yanagimoto et al–Field Trials-Conf., 1981, Inter. Conf. on Comm., Denver Col., Jun. 14–18, 1981, pp. 48.1.1–48.1.5.
Matt et al–Integrated Broad-Band Comm.–IEEE Transactions on Comm., vol. COM-29, No. 6, Jun. 1981, pp. 868–885.

Primary Examiner—Joseph A. Orsino, Jr.
Attorney, Agent, or Firm—Spencer & Frank

[57] ABSTRACT

A broadband integrated subscriber loop system is provided in accordance with the teachings of the present invention. A system is provided in which the subscribers are combined in groups (T1n1-T1n10) each of which is supplied via a single optical communication link. Over the optical waveguide (LWL) of this optical communication link, signals of the channels assigned to subscribers for various telecommunication services are transmitted on a multiplexed basis from the switching unit to an interface unit closely located to the subscribers of the group. In the interface unit the channels are separated and subscriber-assigned multiplexers (Mux 5) combine the channels assigned to a subscriber in accordance with the transmission capacity required into a subscriber time-division-multiplex signal. This signal is transmitted over a subscriber line in the form of a coaxial electric line (KL 1) to subscriber's taps, where the signals for terminals located at the top are separated via demultiplexers (Demux 3, Demux 4, Demux 5, Demux 6). Signals to be transmitted from a subscriber's terminals to the switching unit are combined in digital form (Mux 2, Mux 3, Mux 4), and a multiplexer (Mux 1) in the interface unit combines signals from all subscribers of the group into a back-channel multiplex signal which is transmitted to the switching unit over an optical communication link using the same or a second optical waveguide. In the switching unit, a demultiplexer (Demux 1) separates the received signals into the signals from the individual subscribers, and the signals of each subscriber are split up according to the subscriber's various telecommunications services. The system, including the terminals, is fully digital.

4 Claims, 1 Drawing Figure

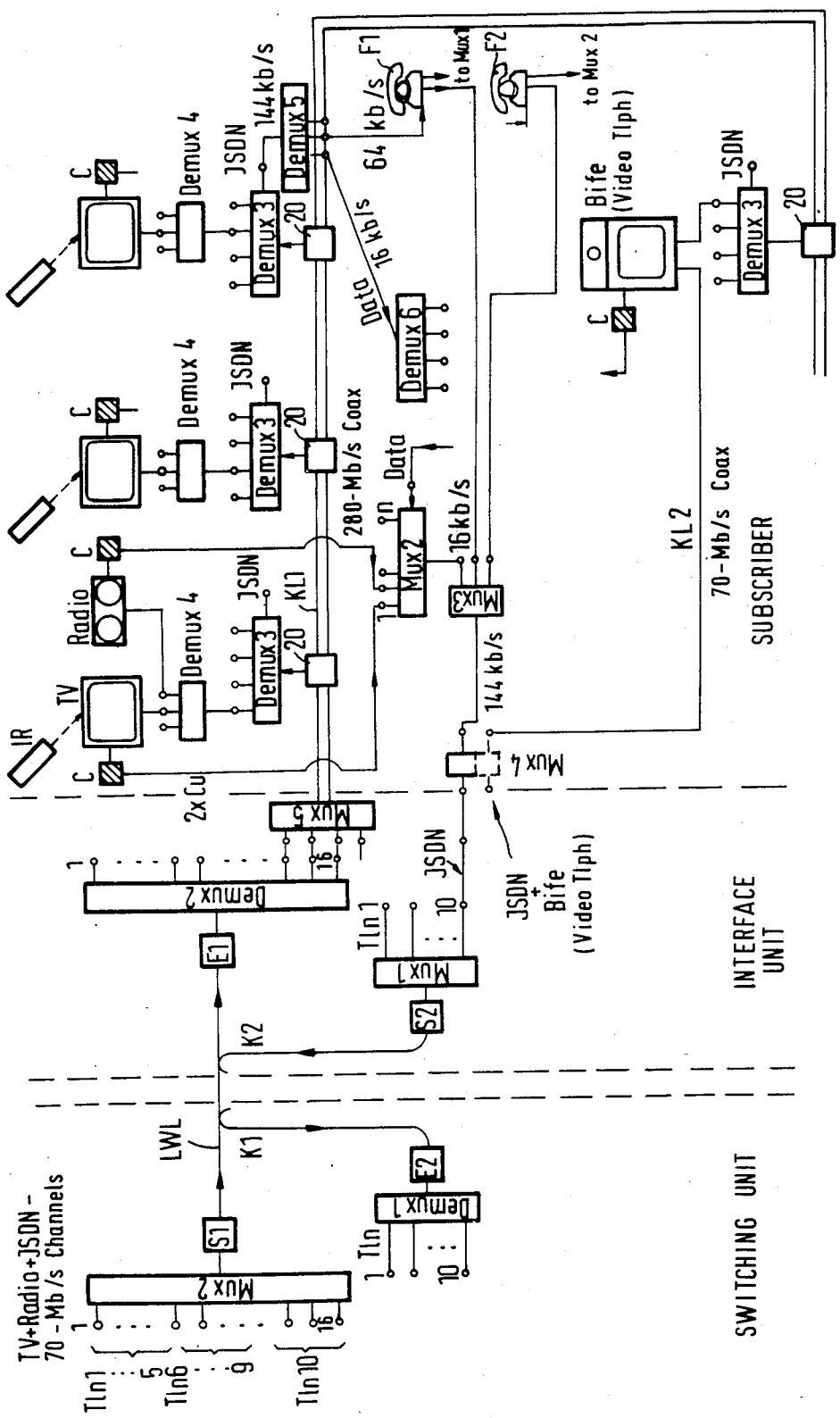

4,686,667

BROADBAND INTEGRATED SUBSCRIBER LOOP SYSTEM

The present invention relates to a communication system as set forth in the preamble of claim 1.

A communication system of this kind is disclosed in EP-B-No. 0024618. In this system, the switching unit is connected to each of the subscribers by one or two optical waveguides in a star configuration. Each optical waveguide from the switching unit to a subscriber represents a channel over which signals for several telecommunication services can be transmitted on a multiplex basis. Only the signals of the channels of an Integrated Services Digital Network (ISDN) are transmitted in a digital form (64 kb/s), while the signals of the other telecommunication services, such as television, stereo broadcasting, and video telephony, are transmitted in analog form. To transmit the signals of the latter services, frequency-division multiplexing is therefore used. The same applies to the signal transmission from the subscriber to the switching unit, for which either the same or a second optical waveguide is used.

At the subscriber, the received multiplex signal is separated into the stereophonic and television signals and the signals of the other telecommunication services. The television and stereophonic signals are transmitted over a common coaxial line to several taps in the subscriber's home. From the taps, they can be selectively fed to the terminals, such as television and stereophonic receivers.

The signals of the other services are distributed to the various terminals at the subscriber by an independent line network (not shown).

This system thus has one or two optical links per subscriber, and all these optical links have the same maximum transmission capacity. The fact that different subscribers have very different communication requirements is left out of account.

The object of the invention is to provide a communication system for the subscriber loop plant which is less costly than the known system and can be designed to meet the different and diffently growing communication requirements of the subscribers.

This object is attained as set forth in claim 1. Further advantageous aspects of the invention are claimed in the subclaims.

The solution in accordance with the invention has the advantage of satisfying all of the following requirements, which are not fulfilled by any of the known systems in their entirety:

1. Service integration:
The system is an integrated services system because it can handle the following telecommunication services: ISDN services, sound broadcasting (stereo broadcasting) and interactive cable television, teleconferencing and video telephony.

2. Modularity:
The telecommunication services can be implemented independent of each other.

3. Economy:
Each service is economically competitive with conventional solutions independently of the other, and the entirety of the services is realizable at lower cost than the individual services realized by known methods.

4. Flexibility:
The system is adaptable to future requirements and extensible.

5. Quality of Transmission:
The system provides a very high transmission quality.

6. Realizability:
The system can be realized with existing technologies.

In the course of the following description, it will be explained by what measures the foregoing advantageous properties of the system are achieved.

The invention will now be explained with reference to the accompanying drawing, whose single figure is a schematic diagram of an embodiment of the system in accordance with the invention.

Between a switching unit and each subscriber connected thereto, at least one broadband channel is provided over which signals for several telecommunication services, e.g., television signals, stereophonic signals, signals for ISDN services, teleconferencing signals, and videotelephone signals, can be transmitted to the subscriber. Such a channel has a bit rate of, e.g., 70 Mb/s. All signals which are combined in this channel are digital signals, and the combination is effected by time-division multiplexing.

A switching unit equipped for the various telecommunication services referred to above contains a multiplexer Mux 2 which combines, e.g., 16 channels assigned to a group of ten subscribers into a bit stream of, e.g., 1.12 Gb/s by time-division multiplexing. An optical transmitter S1 converts this bit stream into an optical signal which is transmitted over an optical waveguide LWL to an optical receiver E1 and separated into the 16 channels by a demultiplexer Demux 2. The optical receiver and the demultiplexer 2 are contained in an interface unit located near the ten subscribers to which the total of 16 channels is assigned. This interface unit can be installed, for example, in the cellar of a multiple dwelling in which the ten subscribers have their living rooms and offices.

This makes the system economical, because an optical link is required only for every ten subscribers, not for each subscriber, so that considerable cost savings are effected.

The allocation of the total of 16 channels to the individual subscribers of the group of ten subscribers depends on the subscribers' individual communication requirements. In the example shown, a single channel suffices for the needs of each of the subscribers 1 to 5, whereas each of the subscribers 6 to 9 needs two channels, and the subscriber 10 even three channels. A subscriber needs more than one channel if he or she wants to have more transmission capacity available for any of the telecommunication services than is offered for this service by one channel. If, for example, a channel has transmission capacity for only one television porgram besides capacity for other services, and a subscriber wants to operate three television receivers in his rooms in order to watch three different programs, he or she needs three of the 16 channels for himself or herself alone.

In the embodiment shown, the subscriber 10 has three channels. From the interface unit, the channels assigned to a subscriber lead to the subscribers 1 to 10 in a star configuration, the drawing showing the supply for only one of these subscribers. In the interface unit, a multiplexer Mux 5 combines the three channels assigned to this subscriber into a subscriber time-division-multiplex signal whose bit frequency is 280 Mb/s, for example. This digital time-division-multiplex signal is transmitted over an electric coaxial line KL1 to the subscriber's living rooms and/or offices. The coaxial line KL1 runs through several rooms in which terminals for any of the telecommunication services are to be connected. In these rooms, the coaxial line contains tap devices 20, where the timedivision-multiplex signal is tapped and applied to a demultiplexer Demux 3, which separates from the TDM signal the signals for the terminals located at this tap. This can be done in two ways: Either the demultiplexer connected to a tap device 20 is adapted to the terminals located at this tap, so that it separates only the signals for these terminals and not for the other telecommunication services, or all demultiplexers are of uniform construction and split the TDM signal—in several steps, if necessary—into the signals of the various telecommunication services.

In the example shown, uniform demultiplexers Demux 3 connected to different tap devices split the TDM signal into different television- and sound-program signals and an ISDN signal. The further splitting of the television and sound signals delivered by the demultiplexers Demux 3 is done by uniform demultiplexers Demux 4 which follow different outputs of the demultiplexers Demux 3 and each supply a television receiver TV with one television program; in one of the cases shown, they additionally supply a stereophonic receiver, labeled as "radio", with a digital stereophonic program. At each tap at which telephone sets and data terminals are present, the signal appearing at an output ISDN of the demultiplexer Demux 3 at a bit rate of 144 kb/s, which is typical of the ISDN, can be separated by means of a demultiplexer Demux 5 into digital 64-kb/s telephone signals and 16-kb/s data signals. The digital telephone signals are fed to digital telephone sets F1 and F2, whereas the data are transferred to a data demultiplexer Demux 6, which distributes them to different data terminals (not shown). One of the outputs of the demultiplexer Demux 3 delivers the received videotelephone signal to a video-telephone terminal ("Bife"=video tlph).

To transmit different control and intelligence signals from the terminals of a subscriber to the interface unit, ordinary electric lines in the form of copper pairs and several multiplexers are used, which will be explained in the following. All television and stereophonic receivers and the video-telephone terminals are equipped with an encoder C, which is controlled by an infrared transmitter IR or by push-button operation and sends out program selection signals or other control signals to be transmitted from the subscriber to the switching unit. A multiplexer Mux 2 combines the program selection and control signals transferred to it from the individual encoders C over the copper pairs, dial signals from the digital telephones F1 and F2, and data from data terminals (not shown) into a 16-kb/s bit stream. A multiplexer Mux 3 combines the digital telephone signals (64-kb/s signals) and the data stream delivered by the multiplexer Mux 2 (16-kb/s) into a signal at the ISDN bit rate of 144 kb/s. If the subscriber has a video-telephone terminal, the output signal of the latter is transmitted at 70 Mb/s over a coaxial line KL2 to a multiplexer Mux 4, which combines the video-telephone signal and the output signal of the multiplexer Mux 3 into a 70-Mb/s data stream which appears at the multiplexer's input designated by ISDN+Bife ("Bife"=video tlph).

The output signal of the multiplexer Mux 4 of this subscriber—either a signal at the 144-kb/s ISDN bit rate or a signal at the 70-Mb/s ISDN/Bife bit rate—is transmitted from the subscriber to the interface unit. There, a multiplexer Mux 1 combines the correspondingly formed signals from all ten subscribers of the group into a bit stream of, e.g., 140 or 560 Mb/s or 1.12 Gb/s, depending on the number and bit rate of the control and intelligence signals to be transmitted from the subscribers to the switching unit. This bit stream is then converted by an optical transmitter S2 into an optical signal which is coupled into the optical waveguide LWL by means of a fiber-optic coupler K2, and coupled out in the switching unit by means of a fiber-optic coupler K1, which feeds it to an optical receiver E2 having its output coupled to the input of a demultiplexer Demux 1. The demultiplexer Demux 1 separates the back-channel multiplex signal into the signals from the individual subscribers, which are split by a demultiplexer (not shown) into signals for the various telecommunication services.

These signals are either switched by the switching unit or used for control purposes; the program selection signals, for example, are used to control the program switching for each of the subscribers.

To transmit the back-channel multiplex signal from the interface unit over the optical waveguide LWL to the switching unit, either wavelength-division multiplexing or single-wavelength duplex can be used. Instead of the bidirectional transmission over the optical waveguide LWL, a second optical waveguide can be used for transmitting the back-channel TDM signal from the interface unit to the switching unit.

Instead of 70 Mb/s, the bit rate in the channels assigned to the subscribers can be 140 Mb/s. The bit rate of the bit stream transmitted from the switching unit over the optical waveguide LWL to the interface unit can be 2.24 Gb/s instead of 1.12 Gb/s. Instead of the above-described and illustrated copper-conductor-cable star network for combining the control and intelligence signals to be transmitted from a subscriber's terminals to the switching unit, one copper-conductor cable can be installed which has different series-connected feeding points into which the various terminals feed their signals via suitable multiplexers.

If the transmission capacity of the optical waveguide, which is operated as described, is not sufficient for handling the various telecommunication services, the optical waveguide can be used in a wavelength-division-multiplex mode by adding further optical transmitters and receivers; the same applies to the second optical waveguide that may be provided for transmission from the interface unit to the switching unit. The multiplex transmission would then be a time- and wavelength-division-multiplex transmission.

In the following, a few of the above-mentioned advantages of the system described will be explained.

None of the services integrated in the system is dependent on any other system, i.e., interactive cable television works without ISDN services or video telephony, and ISDN services require neither interactive cable television nor video telephony. Factors contributing to the economy of the system and the competitiveness of the individual services are that, thanks to the all-digital transmission from the switching unit to the terminals, very-large-scale integrated circuits can be used, that no analog signal processing is required in the terminals, that the supply lines and the lines at the subscriber's home can be low-cost copper conductors, and that low-cost branch circuits can be used at the taps.

The system is adaptable to future requirements as the optical waveguide, particularly a single-mode fiber, permits maximum bit rates. Therefore, the number of subscribers connected to the optical waveguide can be varied within wide limits, and so can the bit rates in the channel. If the transmission capacity of the optical waveguide is limited by dispersion, and additional capacity is required, additional signals can be transmitted by using wavelengthdivision multiplexing, so that the capacity of the optical communication system can be increased considerably.

Because of the all-digital signal transmission at high bit rates from the source to the subscriber's terminal and because of the optical waveguide's immunity to interference, an extremely high signal quality is achieved. As for the realizability of the system, it is pointed out that systems operating at the above bit rates have already been realized. Already today, large-scale integrated circuits can be impelemented up to about 560 Mb/s with bipolar technology, and up to 140 Mb/s with MOS technology.

I claim:

1. A broadband communications system for providing a plurality of telecommunications services in each direction of transmission between a switching unit and a plurality of subscribers grouped in a selected location, said broadband communications system comprising:

a plurality of channels at said switching unit, each of said plurality of channels for providing a plurality of differing telecommunications services to respective ones of said plurality of subscribers, each of said plurality of channels being assigned to a particular one of said plurality of subscribers and each of said plurality of subscribers being assigned to at last one of said plurality of channels;

means at said switching unit for multiplexing said plurality of channels into an associated channel assigned to said selected location, said means for multiplexing employing digital, time-division multiplexing techniques to combine signal information from each of said plurality of channels on a timedivision multiplex basis in said associated channel;

means at said switching unit for converting said combined signal information on said associated channel into an optical signal and optically transmitting said optical signal over a single optical waveguide to said selected location;

means at said selected location for converting said optical signal on said single optical waveguide into an electrical signal corresponding to said combined signal information on said associated channel;

means at said selected location for demultiplexing said electrical signal into a plurality of telecommunication service channels, each telecommunication service channel providing a plurality of differing telecommunications services and corresponding respectively to each of said plurality of channels at said switching unit;

means at said selected location for multiplexing a plurality of telecommunications service channels associated with a particular one of said plurality of subscribers into a time division multiplex signal and transmitting said time division multiplex signal to a site at which said particular subscriber is located;

tap means at said site for providing portions of said time division multiplex signal to individual use locations;

demultiplexer means at said site for separating said portions of said time division multiplex signal from said tap means into at least individual ones of said telecommunications service channels associated with a particular subscriber and individual ones of said plurality of differing telecommunications services for use at said individual use locations;

means at said site for receiving telecommunication signals from said individual use locations and combining said telecommunication signals received into a single signal on a time division multiplex basis;

means at said selected location for assembling on a time division multiplex basis a plurality of said single signals, said means for assembling producing a digital backchannel signal to be transmitted to said switching unit containing back-channel information associated with each of said plurality of subscribers;

means at said selected location for converting said digital back-channel signal into a back-channel optical signal and optically transmitting said back-channel optical signal to said switching unit; and means at said switching unit for receiving said back-channel optical signal and converting said back-channel optical signal into a plurality of subscriber back-channel signals, each of said plurality of subscriber back-channel signals corresponding to one of said plurality of single signals and being associated with an individual one of said plurality of subscribers.

2. The broadband communications system according to claim 1 where said plurality of channels is equal to or greater than said plurality of subscribers.

3. The broadband communications system according to claim 1 wherein the number of said plurality of subscribers is selected as a function of the transmission capacity and signal quality required for each of the individual subscribers within said plurality of subscribers.

4. The broadband communications system according to claim 1 wherein said back-channel optical signal is transmitted to said switching unit through said single optical waveguide.

* * * * *